United States Patent
Kim et al.

(10) Patent No.: US 8,184,520 B2
(45) Date of Patent: *May 22, 2012

(54) OPTICAL PICKUP DEVICE HAVING CHROMATIC ABERRATION CORRECTION LENS

(75) Inventors: Tae-kyung Kim, Seoul (KR);
Young-man Ahn, Suwon-si (KR);
Chong-sam Chung, Suwon-si (KR);
Hea-jung Suh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 476 days.

This patent is subject to a terminal disclaimer.

(21) Appl. No.: 11/842,210

(22) Filed: Aug. 21, 2007

(65) Prior Publication Data
US 2007/0286051 A1    Dec. 13, 2007

Related U.S. Application Data

(60) Continuation of application No. 11/097,287, filed on Apr. 4, 2005, now Pat. No. 7,391,704, which is a division of application No. 09/883,492, filed on Jun. 19, 2001, now Pat. No. 6,987,724.

(30) Foreign Application Priority Data

Sep. 21, 2000   (KR) .................................. 2000-55477

(51) Int. Cl.
*G11B 7/00*   (2006.01)
(52) U.S. Cl. ............ 369/112.24; 369/112.01; 369/44.23
(58) Field of Classification Search ............... 369/44.28, 369/112.23, 44.23, 112.24
See application file for complete search history.

(56) References Cited

U.S. PATENT DOCUMENTS

| | | | |
|---|---|---|---|
| 4,610,515 A | 9/1986 | Tanaka | |
| 5,479,296 A | 12/1995 | Maruyana et al. | |
| 5,638,221 A | 6/1997 | Maruyama et al. | |
| 5,657,171 A * | 8/1997 | Maruyama et al. | ........... 359/793 |
| 6,570,827 B1 | 5/2003 | Yamamoto et al. | |

(Continued)

FOREIGN PATENT DOCUMENTS

JP    64-061715    3/1989
(Continued)

OTHER PUBLICATIONS

English translation of JP09-311271.*
U.S. Appl. No. 11/097,287, filed Apr. 4, 2005, Tae-kyung Kim et al., Samsung Electronics Co., Ltd.
U.S. Appl. No. 11/709,737, Feb. 23, 2007, Tae-kyung Kim et al., Samsung Electronics Co., Ltd.

(Continued)

*Primary Examiner* — Jorge L Ortiz Criado
(74) *Attorney, Agent, or Firm* — NSIP Law

(57) ABSTRACT

An optical pickup device includes a light source to emit light, an objective lens to focus the light on a recording medium to form a light spot, an optical path changer on an optical path between the light source and the objective lens to change the path of incident light, a chromatic aberration correction lens disposed on an optical path between the light source and the objective lens, and a photodetector to receive light which is reflected from the recording medium and is then incident thereon through the optical path changer. The chromatic aberration correction lens corrects a chromatic aberration occurring due to a change in the wavelength and/or due to an increase in a wavelength bandwidth of the light. The chromatic aberration correction lens includes at least two lenses such that a lens having a positive power and a lens having a negative power are adjacent to each other.

44 Claims, 9 Drawing Sheets

U.S. PATENT DOCUMENTS

| | | |
|---|---|---|
| 6,987,724 B2 | 1/2006 | Kim et al. |
| 7,391,704 B2 | 6/2008 | Kim et al. |
| 2008/0013433 A1 | 1/2008 | Kimura et al. |

FOREIGN PATENT DOCUMENTS

| | | |
|---|---|---|
| JP | 02-257115 | 10/1990 |
| JP | 03-093048 | 4/1991 |
| JP | 3-155515 | 7/1991 |
| JP | 04-63312 | 2/1992 |
| JP | 4-289530 | 10/1992 |
| JP | 06-076346 | 3/1994 |
| JP | 06-215409 | 8/1994 |
| JP | 07-311337 | 11/1995 |
| JP | 9-212908 | 8/1997 |
| JP | 09-311271 | 12/1997 |
| JP | 09-318873 | 12/1997 |
| JP | 11-016192 | 1/1999 |
| JP | 11-120565 | 4/1999 |
| JP | 2000-019388 | 1/2000 |
| JP | 2001-176109 | 6/2001 |
| JP | 2001-324673 | 11/2001 |
| JP | 2002-082280 | 3/2002 |

OTHER PUBLICATIONS

Office Action dated Jul. 29, 2008 of the Japanese Patent Application No. 13-204104.

Chinese Office Action issued on Jul. 4, 2003, in counterpart Chinese Application No. 01119548.7 (8 pages, in Chinese, with complete English translation).

Japanese Office Action issued on Nov. 2, 2004, in counterpart Japanese Application No. 2001-204104 (2 pages, in Japanese, no English translation).

Japanese Office Action issued on Jun. 20, 2006, in counterpart Japanese Application No. 2001-204104 (2 pages, in Japanese, no English translation).

Japanese Office Action issued on Oct. 12, 2010, in corresponding Japanese Patent Application No. 2007-039934 (4 pages).

Japanese Office Action issued on Oct. 12, 2010, in counterpart Japanese Application No. 2007-03934 (8 pages, in Japanese, including complete English translation).

Japanese Office Action issued on Jan. 4, 2012, in corresponding Japanese Patent Application No. 2007-039934 (2 pages).

Japanese Office Action issued on Jan. 4, 2012, in corresponding Japanese Patent Application No. 2006-284260 (2 pages).

* cited by examiner

PRIOR ART

OPTICAL PICKUP DEVICE HAVING CHROMATIC ABERRATION CORRECTION LENS

CROSS-REFERENCE TO RELATED APPLICATIONS

This application is a continuation of application Ser. No. 11/097,287 filed on Apr. 4, 2005, now U.S. Pat. No. 7,391,704, which is a division of application Ser. No. 09/883,492 filed on Jun. 19, 2001, now U.S. Pat. No. 6,987,724, which claims the benefit of Korean Patent Application No. 2000-55477 filed on Sep. 21, 2000, in the Korean Industrial Property Office, now the Korean Intellectual Property Office, the disclosures of which are incorporated herein by reference.

BACKGROUND OF THE INVENTION

1. Field of the Invention

The present invention relates to an optical pickup device, and more particularly, to an optical pickup device having a chromatic aberration correction lens to correct a chromatic aberration caused by a change in a wavelength and/or an increase in a wavelength bandwidth of light emitted from a light source, occurring when changing a recording/reproducing power output.

2. Description of the Related Art

The recording capacity of an optical recording and reproducing apparatus is determined by the size S of a light spot formed on an optical disc by the objective lens of an optical pickup device. Generally, the size S of the light spot is proportional to a wavelength $\lambda$ and is inversely proportional to a numerical aperture (NA). Accordingly, to obtain a higher information recording density than that obtained on conventional optical discs such as CDs or DVDs, an optical pickup device (hereinafter, referred to as a high density optical pickup device) used for next generation DVDs (hereinafter, referred to as HD-DVDs) under development is anticipated to use a light source emitting blue light and an objective lens having a NA of at least 0.6, to reduce the size of the light spot formed on the optical disc.

However, an optical material such as glass or plastic used as the material of the objective lens in the conventional optical pickup device has a very steep change in refractivity in a wavelength band shorter than 650 nm. Table 1 shows changes in refractivity of M-BaCD5N, which is manufactured by Hoya and is used as a glass material for molding the objective lens, according to a wavelength.

TABLE 1

| Change in wavelength | Change in refractivity of M-BaCD5N glass manufactured by Hoya |
|---|---|
| 650 nm → 651 nm | 0.000038 |
| 405 nm → 406 nm | 0.000154 |

As seen from Table 1, an optical material has a change in refractivity with respect to a small wavelength change of about 1 nm in a short blue wavelength band, for example, a 405 nm wavelength band, four times larger than in a 650 nm wavelength used in a conventional DVD optical pickup device. Such a steep change in refractivity of the optical material with respect to blue light causes a high density optical recording and reproducing apparatus using a blue light source to be defocused, thereby degrading performance.

In other words, an optical recording and reproducing apparatus uses different recording light power and reproducing light power. This change in the light output power between recording and reproduction causes the wavelength change. For example, in the case of the blue light source, the change in the wavelength is about 0.5-1 nm. Usually, when the output of the light source increases, the wavelength of light emitted from the light source is longer. Accordingly, the high density optical pickup device using blue light has a large chromatic aberration in the objective lens designed for a reference wavelength due to the change in the wavelength during switching between recording light output power and reproducing light output power, causing defocus.

For example, as shown in FIGS. 1 through 3, an objective lens, which has a numerical aperture of 0.65 and is designed for a wavelength of 405 nm, has a large wavefront aberration (also referred to as an optical path difference (OPD)) and defocus with respect to a fine change of about 1 nm in wavelength. FIG. 1 is a graph illustrating intensities of light spots formed on an optical disc according to defocus resulting from a change in light output power between recording and reproduction. FIGS. 2 and 3 are graphs illustrating the amount of the OPD and the amount of defocus, respectively, of the objective lens having a numerical aperture of 0.65, according to the change in the wavelength.

Although defocus caused by the change in the wavelength can be corrected by adjusting the objective lens, it takes a relatively long time to actuate the objective lens using an actuator and to follow the change in the wavelength, and during this time, the quality of a recorded or reproduced signal is degraded. Defocus occurring when output power increases for recording results in a lack of recording light power, and defocus occurring when output power decreases for reproduction increases jitter.

In other words, when the output power of the light source increases when recording information on the optical disc, the wavelength of light emitted from the light source is relatively long, for example, 406 nm, so that the light spot formed on the optical disc is defocused. Until the actuator is adjusted in response to the defocus, recording cannot be performed. Then, when the output power of the light source decreases for reproduction, the wavelength of light emitted from the light source is relatively short, for example, 405 nm. Since the actuator has been adjusted with respect to the lengthened wavelength, the light spot is defocused again. As shown in FIG. 4, the jitter increases in the reproduced signal due to defocus. FIG. 4 is a graph illustrating the amount of jitter in the reproduced signal according to the amount of defocus when the objective lens designed with respect to a reference wavelength of 405 nm and having a numerical aperture of 0.65 is used.

Moreover, when the light source is actuated at a high frequency (HF) to reduce feedback noise of the light source due to light reflected from the optical disc to the light source, a wavelength bandwidth of the light source increases, resulting in chromatic aberration, and this chromatic aberration degrades the reproduced signal.

Accordingly, a high density recordable optical pickup device capable of recording and reproducing repeatedly is required to have an optical system capable of suppressing or correcting chromatic aberration resulting from a change in the wavelength of light emitted from the light source due to the change in output power between recording and reproduction. Japanese Patent Publication No. Hei 9-311271 discloses a structure employing a refraction/diffraction-monolithic-type objective lens to correct chromatic aberration resulting from a change in wavelength. A conventional refraction/diffraction-monolithic-type objective lens is an aspheric lens whose surface receiving or emitting light is aspheric. Diffraction patterns are integrally formed on this aspheric surface so that a refractive lens and a diffraction lens are integrated into a single lens.

The refraction/diffraction-monolithic-type objective lens is designed to satisfy $(1+V_{HOE}/V)(n_2-1) > 0.572$ when it is assumed that refractivities of the lens at a central wavelength $\lambda_1$, a minimum wavelength $\lambda_2$ and a maximum wavelength $\lambda_3$ of light emitted from a semiconductor laser are $n_1$, $n_2$ and $n_3$, and that the Abbe numbers of the refractive lens and the diffraction lens are $V=(n_2-1)/(n_1-n_3)$ and $V_{HOE}=\lambda_2/(\lambda_1-\lambda_3)$, respectively. Accordingly, the conventional refraction/diffraction-monolithic-type objective lens has a numerical aperture of at least 0.7 and can remove chromatic aberration due to the change in the wavelength of light emitted from the semiconductor laser. However, an optical pickup device employing the conventional refraction/diffraction-monolithic-type objective lens cannot obtain sufficient output power necessary for recording since optical efficiency is lowered to about 70-85% due to the properties of the diffraction lens.

SUMMARY OF THE INVENTION

Accordingly, it is an object of the present invention to provide an optical pickup device to correct a chromatic aberration of an objective lens with an additional chromatic aberration correction lens having a relatively infinite focal length as compared to a focal length of the objective lens.

It is a further object of the invention to provide an optical pickup device to overcome the above-mentioned problems.

Additional objects and advantages of the invention will be set forth in part in the description which follows, and, in part, will be obvious from the description, or may be learned by practice of the invention.

The foregoing objects of the present invention are achieved by providing an optical pickup device including a light source to emit light; an objective lens to focus light incident from the light source on a recording medium to form a light spot; an optical path changer disposed on an optical path between the light source and the objective lens, the optical path changer to change the path of light incident from the recording medium; a chromatic aberration correction lens disposed on the optical path between the light source and the objective lens, the chromatic aberration correction lens to correct a chromatic aberration occurring due to a change in a wavelength and/or due to an increase in a wavelength bandwidth of the light emitted from the light source, the chromatic aberration correction lens including a lens having a positive power and a lens having a negative power adjacent to each other, a total focal length of the chromatic aberration correction lens being relatively infinite relative to the objective lens; and a photodetector to receive light incident from the optical path changer.

The chromatic aberration correction lens has a focal length of at least 10 m. Furthermore, the Abbe number of an optical material of which the lens having the positive power is formed, at a d-line, is larger than that of an optical material of which the lens having the negative power is formed, at the d-line.

In one embodiment, the chromatic aberration correction lens includes a first lens having a negative power and a second lens having a positive power, which are sequentially disposed from the light source, and the first and second lenses have similar power. Here, the first and second lenses are formed of glass materials, which have different Abbe numbers at a d-line and similar refractivities. The surfaces of the first and second lenses facing the light source and the objective lens, respectively, have relatively large negative radii of curvature, and the surface between the first and second lenses has a relatively small positive radius of curvature.

In another embodiment, the chromatic aberration correction lens includes a first lens having a positive power and a second lens having a negative power, which are sequentially disposed from the light source, the surfaces of the first and second lenses facing the light source and the objective lens, respectively, have positive radii of curvature, the surface between the first and second lenses has a negative radius of curvature, and all the surfaces have similar magnitudes of radii of curvature.

In still another embodiment, the chromatic aberration correction lens includes a first lens having a negative power, a second lens having a positive power and a third lens having a negative power, which are sequentially disposed from the light source. The first and third lenses are formed of glass materials, respectively, which have similar Abbe numbers at a d-line, and the second lens is formed of a glass material having an Abbe number relatively different from those of the glass materials of the first and third lenses. The surfaces of the first and third lenses facing the light source and the objective lens, respectively, have positive radii of curvature, the surface between the first and second lenses has a positive radius of curvature, and the surface between the second and third lenses has a negative radius of curvature.

Here, preferably, the chromatic aberration correction lens is designed to satisfy $0.95 \leq h_o/h_i \leq 1.05$, wherein a height of the light incident on the chromatic aberration correction lens is $h_i$, and the height of light coming out through the chromatic aberration correction lens is $h_o$. The chromatic aberration correction lens is designed to satisfy $0 < 1/(f1 \cdot v1) + 1/(f2 \cdot v2) + \ldots + 1/(fn \cdot vn) < 0.008$, wherein the focal lengths of lenses constituting the chromatic aberration correction lens and the objective lens with respect to the light source are f1, f2, ... and fn, and the Abbe numbers of optical materials forming the lenses at a d-line are v1, v2, ... and vn.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
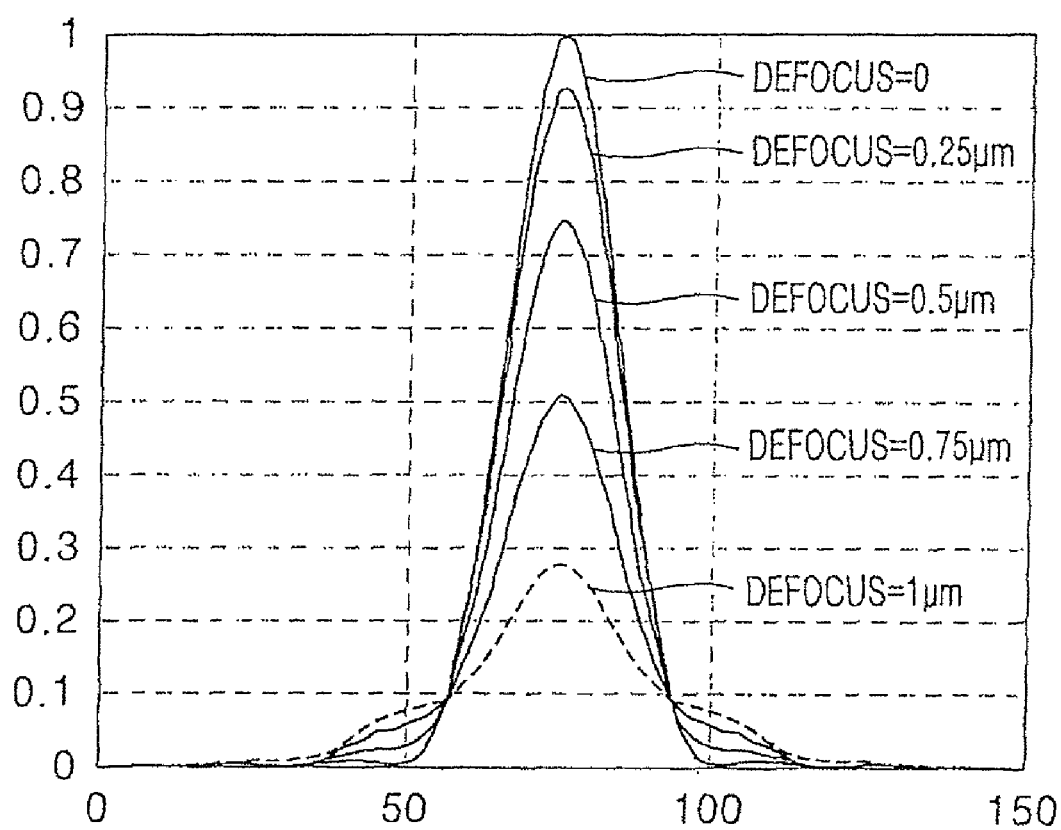
FIG. 1 is a graph illustrating the intensities of light spots formed on an optical disc according to defocus resulting from a change in light output power between recording and reproduction.
Figure 2:
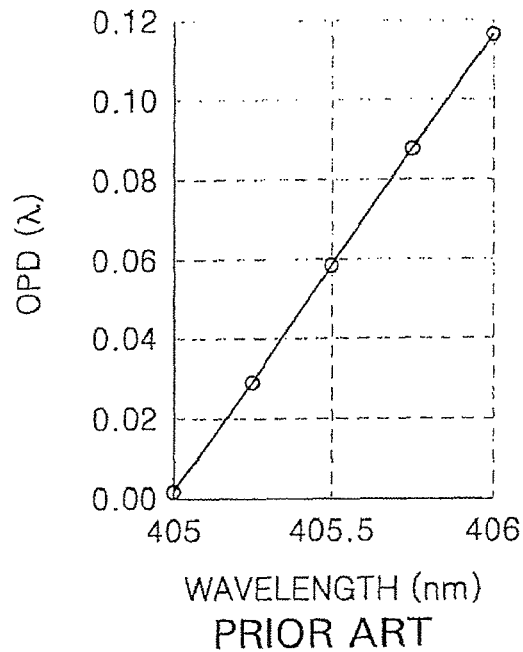
FIGS. 2 and 3 are graphs illustrating the amount of the wavefront aberrations (or optical path difference (OPD)) and the amount of defocus, respectively, of an objective lens having a numerical aperture of 0.65, according to a change in a wavelength.
Figure 3:
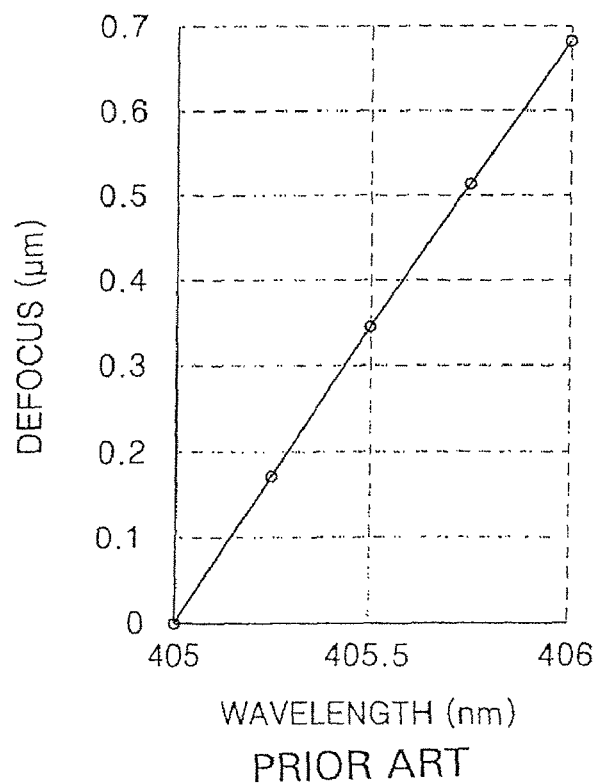
Figure 4:
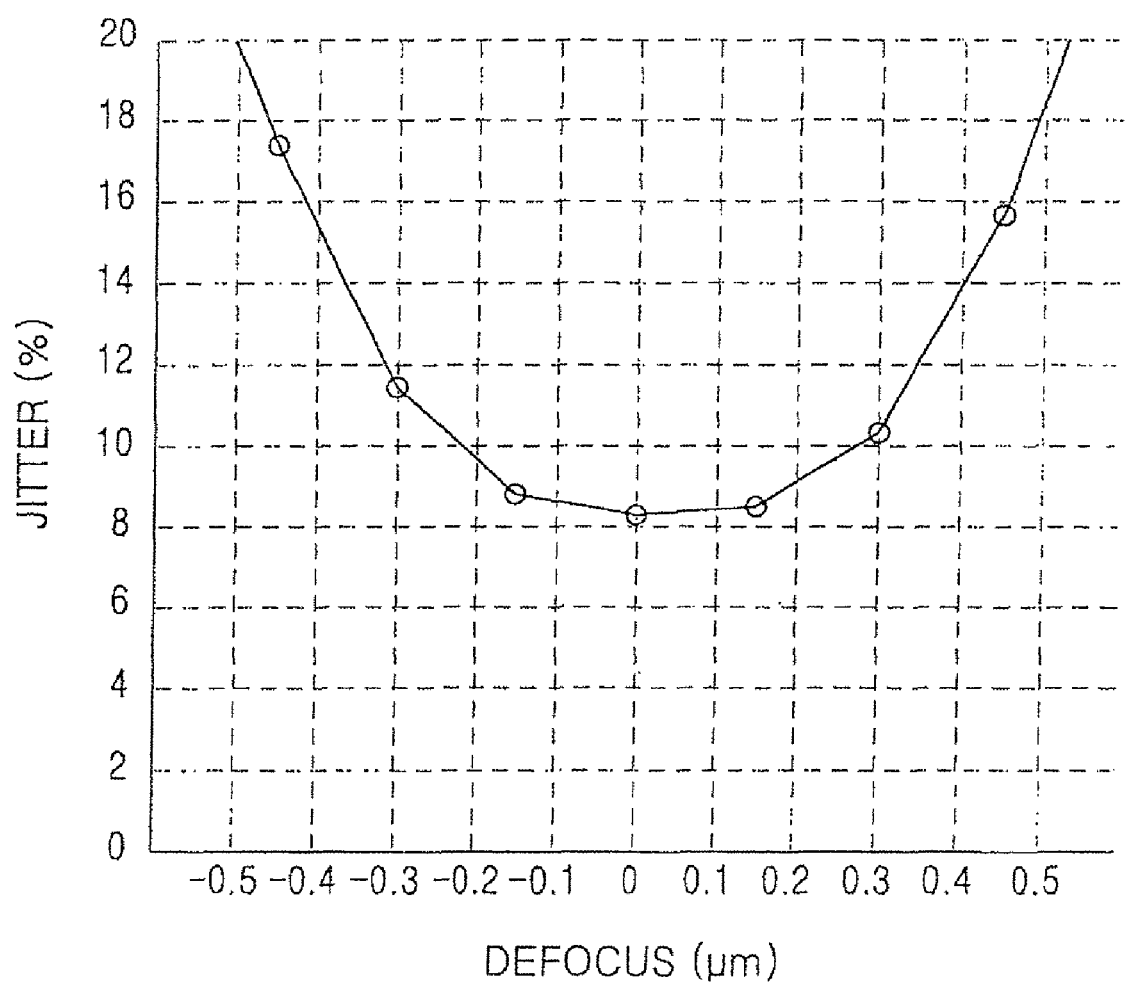
FIG. 4 is a graph illustrating the amount of jitter in a reproduced signal according to the amount of defocus when an objective lens designed with respect to a reference wavelength of 405 nm and having a numerical aperture of 0.65 is used.

Reference will now be made in detail to the present preferred embodiments of the present invention, examples of which are illustrated in the accompanying drawings, wherein like reference numerals refer to like elements throughout.

Figure 5:
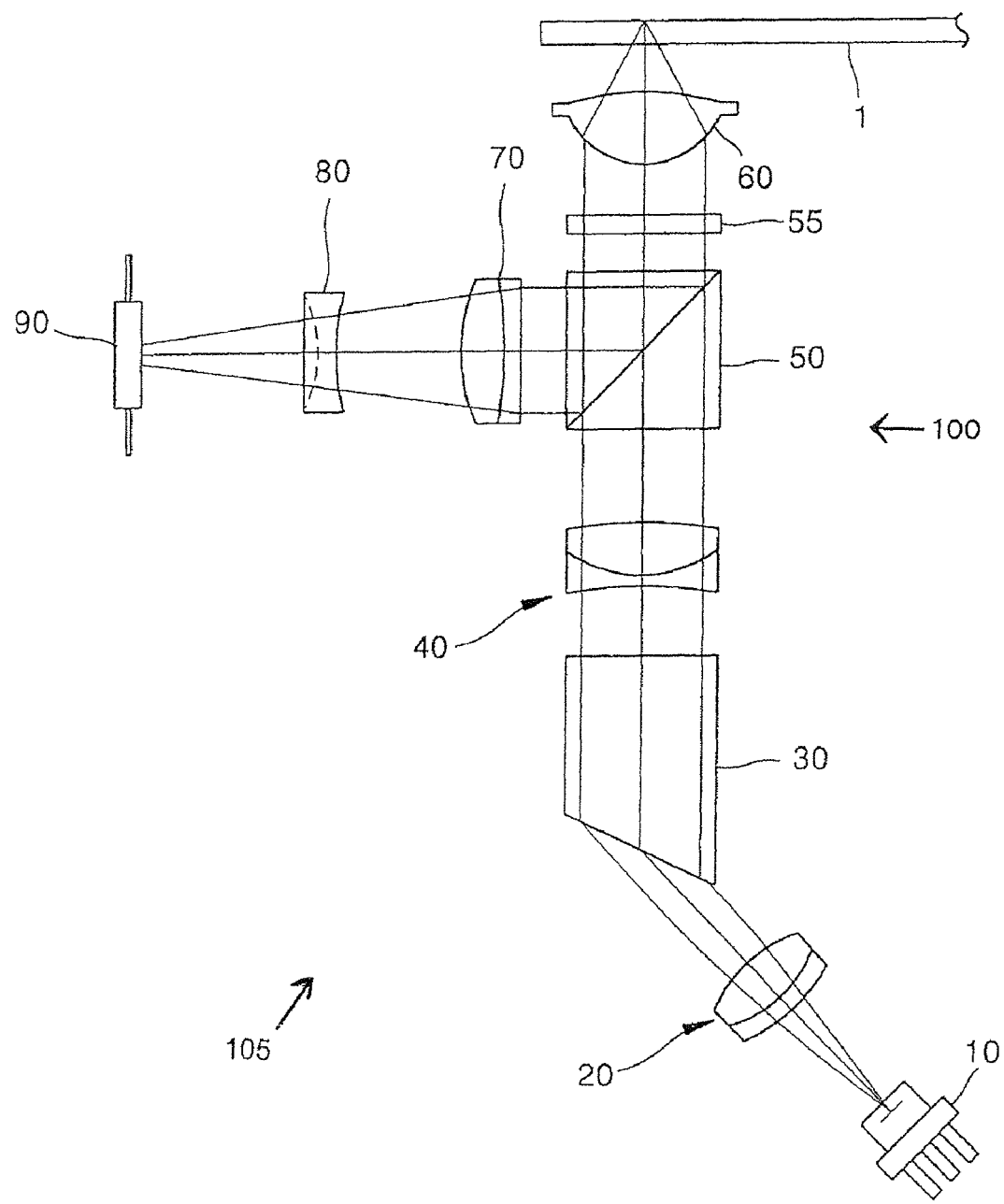
FIG. 5 is a schematic diagram illustrating the optical configuration of a high density optical pickup device according to an embodiment of the present invention.

Referring to FIG. 5, an optical pickup device 105 according to an embodiment of the present invention includes a light source 10, an optical path changing unit 100 to change an optical path of incident light, an objective lens 60 to focus incident light from the light source 10 on a high density recording medium 1 to form a light spot (not shown) thereon, a photodetector 90 to receive incident light, which is reflected from the recording medium 1 and passes through the optical path changing unit 100, and a chromatic aberration correction lens 40 to correct a chromatic aberration due to a change in a wavelength of the light emitted from the light source 10 and an increase in a wavelength bandwidth.

A blue semiconductor laser emitting light of a wavelength of at most 420 nm, for example, a wavelength of 405 nm is used as the light source 10. The semiconductor laser may be either an edge emitting laser or a vertical cavity surface emitting laser. Here, when the light source 10 emits light having a wavelength of 405 nm at reproduction power, the light source 10 emits light having a wavelength which is longer than the wavelength at the reproduction power, for example, a wavelength of 406 nm, at recording power. Due to such a change in the wavelength resulting from a change in light output power and/or an increase in the wavelength caused by driving the light source 10 with high frequency (HF), a chromatic aberration occurs in the objective lens 60. This chromatic aberration is corrected by the chromatic aberration correction lens 40 according to the present invention as will be described later.

The optical path changing unit 100 is disposed between the light source 10 and the objective lens 60 to change the path of incident light. As shown in FIG. 5, the optical path changing unit 100 preferably includes a polarizing beam splitter 50 to selectively transmit or reflect incident light according to a polarization characteristic of the incident light, and a quarter wavelength plate 55 to change the polarization of the incident light. Here, a beam splitter (not shown), which transmits and reflects incident light at a predetermined ratio, can be used as the optical path changing unit 100.

The objective lens 60 has a numerical aperture of at least 0.65, for example, 0.75 or 0.85, so that it can form the light spot on the high density recording medium 1, which may be an HD-DVD to record and reproduce information. Here, the objective lens 60 may have a numerical aperture of at least 0.85 when it is composed of a plurality of lenses or is of a solid immersion type. The photodetector 90 receives light reflected from the recording medium 1 and detects an information signal and an error signal.

A collimating lens 20 is disposed on the optical path between the light source 10 and the chromatic aberration correction lens 40. The collimating lens 20 condenses diverging light emitted from the light source 10 to be parallel. As shown in FIG. 5, when the collimating lens 20 is disposed on the optical path between the light source 10 and the optical path changing unit 100, a condensing lens 70 is also disposed between the optical path changing unit 100 and the photodetector 90.

When an edge emitting laser is used as the light source 10, a beam shaping prism 30 is disposed on the optical path between the collimating lens 20 and the optical path changing unit 100 so that recording of information is possible even with low power. Although not shown in FIG. 5, the beam shaping prism 30 shapes an elliptical-like beam emitted from the edge emitting laser into a circular-like beam. The beam shaping prism 30 may alternately be disposed between the light source 10 and the collimating lens 20. As another alternative, when a surface emitting laser emitting a substantially circular-like beam is used as the light source 10, the beam shaping prism 30 can be removed from the pickup device 105 of FIG. 5.

Here, reference numeral 80 denotes a sensing lens 80. For example, when a focus error signal is detected by an astigmatism method, the sensing lens 80 is an astigmatism lens to include an astigmatism into the incident light.

The chromatic aberration correction lens 40 according to the present invention comprises at least two lenses such that a lens having a positive power and a lens having a negative power are disposed to be adjacent to each other. Here, the Abbe number of an optical material, of which the lens having the positive power is formed, at a d-line, exceeds that of an optical material, of which the lens having the negative power is formed, at the d-line.

When the focal lengths of the lenses with respect to the light source 10 are f1, f2, . . . , and the Abbe numbers of the optical materials forming the lenses at the d-line are v1, v2, . . . a condition to correct the chromatic aberration is usually expressed by $$\sum_i \frac{1}{fi \cdot vi} = 0.$$

Considering this condition, the chromatic aberration correction lens 40 according to the present invention is designed, as will be described later in detailed embodiments, such that it satisfies the condition that $$\sum_i \frac{1}{fi \cdot vi}$$

is approximately 0, that is, it satisfies a range given by Equation (1), thereby effectively correcting the chromatic aberration of the objective lens 60.

$$0 < \sum_i \frac{1}{fi \cdot vi} < 0.008 \quad (1)$$

When the optical pickup device 105 according to the present invention includes the collimating lens 20, as shown in FIG. 5, so that parallel light is incident on the chromatic aberration correction lens 40, lenses contributing to $$\sum_i \frac{1}{fi \cdot vi}$$

indicating the correction degree of the chromatic aberration are the chromatic aberration correction lens 40 and the objective lens 60.

The chromatic aberration correction lens 40 according to the present invention as described above has a relatively infinite focal length, for example, a focal length of at least 10 m, as compared with the objective lens 60, so that it has optical power close to 0.

Hereinafter, detailed embodiments of the chromatic aberration correction lens 40 according to the present invention and the optical design data for the objective lens 60 and the chromatic aberration correction lens 40 will be described in detail. In the following embodiments, an optical pickup device according to the present invention includes the collimating lens 20 so that parallel light is incident on the chromatic aberration correction lens 40 or on the objective lens 60, and optical data suitable for a reference wavelength of 405 nm is used as an example.

First, in the case where the chromatic aberration correction lens 40 according to the present invention is not used, the degree of aberration occurring in the objective lens 60 is observed when the wavelength of light emitted from the light source 10 changes from the reference wavelength of 405 nm into a wavelength of 406 nm. When the objective lens 60 has a numerical aperture of 0.75 with respect to the reference wavelength of 405 nm, referring to FIG. 6 and Table 2, the objective lens 60 is realized as a bi-convex lens whose both surfaces are aspheric so that the objective lens 60 focuses incident parallel light on the recording medium 1 having a thickness of 0.6 mm to form a light spot thereon.

TABLE 2

| Element | Radius of curvature (mm) | Gap or thickness (mm) | Material (glass) | Refractivity | Abbe number at the d-line |
|---|---|---|---|---|---|
| Objective lens 60 | 2.012300 (aspheric surface 1) | 1.700000 | 'OG' | 1.623855 | 57.8 |
|  | −18.075156 (aspheric surface 2) | 1.656000 |  |  |  |
| Recording medium 1 | ∞ | 0.600000 | 'CG' | 1.621462 | 31.0 |

Table 3 shows the conic constants and aspheric coefficients of the aspheric surfaces 1 and 2 of the objective lens 60.

TABLE 3

| | Conic constants (K) | Aspheric coefficients | | |
|---|---|---|---|---|
| Aspheric surface 1 | −0.928355 | A: 0.737867E−02 | B: 0.515008E−03 | C: 0.109070E−03 |
| | | D: −0.961470E−04 | E: 0.755098E−04 | F: −0.342032E−04 |
| | | G: 0.921692E−05 | H: −0.137595E−05 | J: 0.843459E−07 |
| Aspheric surface 2 | −135.791497 | A: 0.864934E−02 | B: −0.203022E−02 | C: 0.375653E−03 |
| | | D: −0.431759E−04 | E: −0.337619E−05 | F: −0.123502E−06 |
| | | G: 0.142911E−06 | H: 0.433818E−07 | J: −0.410333E−08 |

Here, when a depth from the apex of an aspheric surface is represented by "z", the $$z = \frac{ch^2}{1+\sqrt{1-(1+K)c^2h^2}} + Ah^4 + Bh^6 + Ch^8 + Dh^{10} + Eh^{12} + Fh^{14} + Gh^{16} + Hh^{18} + Jh^{20} \quad (2)$$

depth z can be expressed by Equation (2).

Here, h is a height from an optical axis, c is a curvature, K is a conic coefficient, and A through J are aspheric coefficients.

The diameter of an incident pupil of parallel light on the objective lens 60 configured as described above is 3.9 mm, and the focal length of the objective lens 60 is about 3.0000 mm.

Figure 6:
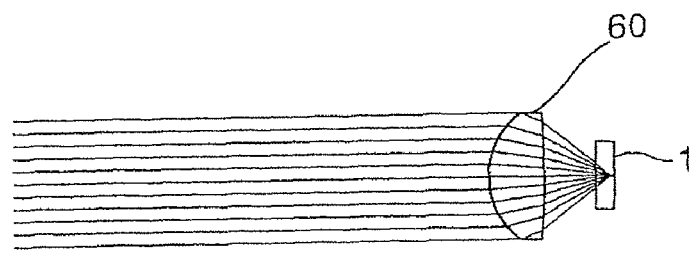
FIG. 6 is a schematic diagram illustrating the structure of an objective lens having a numerical aperture of 0.75 with respect to a reference wavelength of 405 nm and the main optical paths thereof, when a chromatic aberration correction lens according to the present invention is not used.
Figure 7:
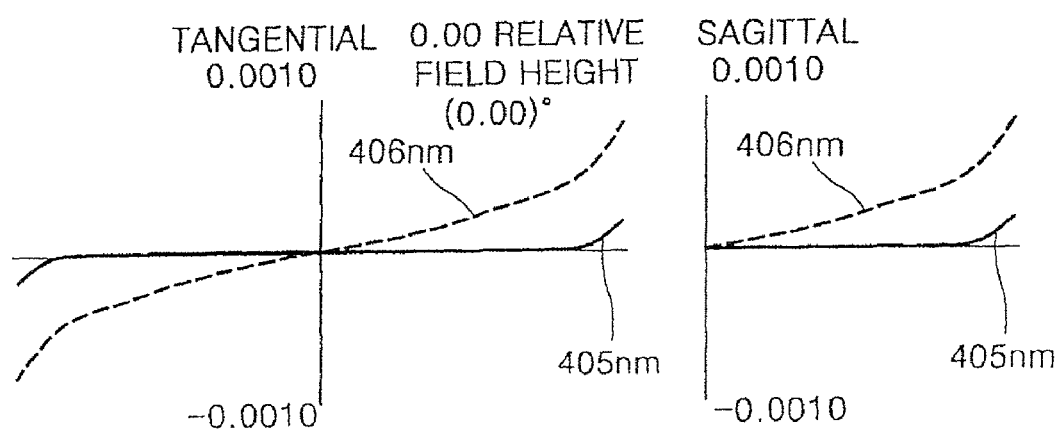
FIG. 7 is a graph illustrating aberrations of the objective lens of FIG. 6.

FIG. 7 shows the degrees of aberration of the objective lens 60 of FIG. 6. As shown in FIG. 7, a large aberration occurs in the objective lens 60 when the wavelength of light emitted from the light source 10 changes from 405 nm, i.e., the reference wavelength, to 406 nm. However, aberration occurring in the objective lens 60 is removed by a chromatic aberration correction lens 40, 140 or 240 installed to the side of the incident pupil of the objective lens 60, according to the present invention, as described below.

Figure 8:
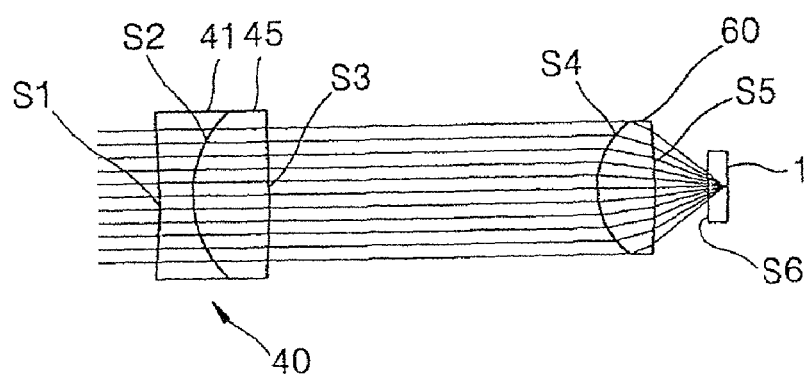
FIG. 8 is a schematic diagram illustrating the main portions and optical paths of an optical pickup device to which a chromatic aberration correction lens according to a first embodiment of the present invention is applied.
Figure 10:
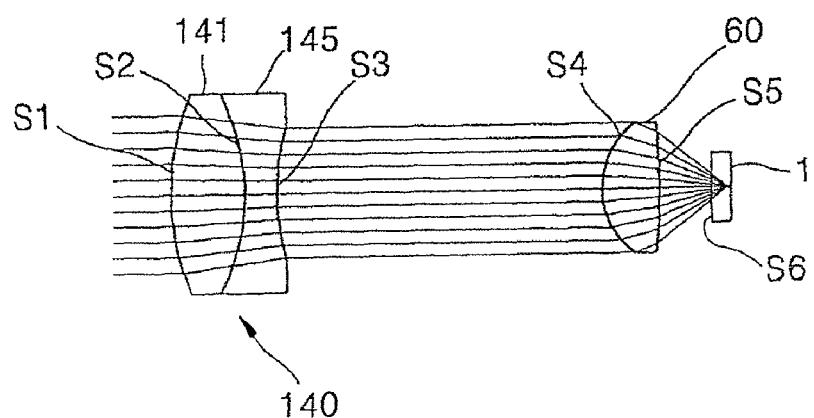
FIG. 10 is a schematic diagram illustrating the main portions and optical paths of an optical pickup device to which a chromatic aberration correction lens according to a second embodiment of the present invention is applied.
Figure 12:
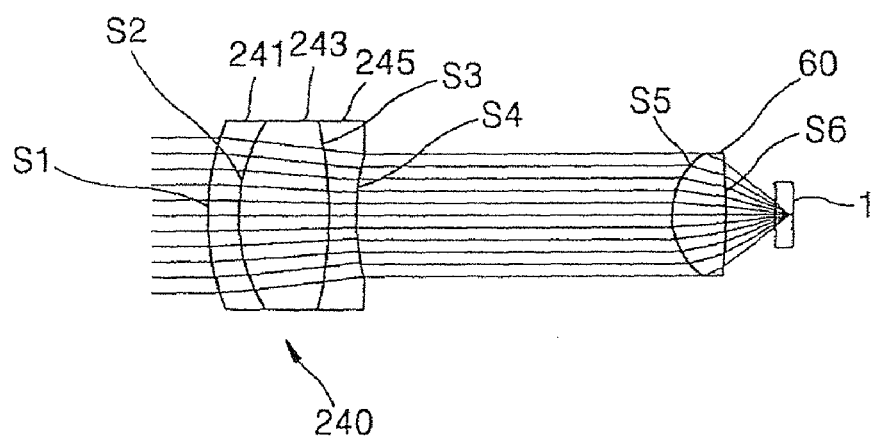
FIG. 12 is a schematic diagram illustrating the main portions and optical paths of an optical pickup device to which a chromatic aberration correction lens according to a third embodiment of the present invention is applied.

FIGS. 8, 10 and 12 show the chromatic aberration correction lenses 40, 140 and 240 according to embodiments of the present invention, which are installed to the side of the incident pupil of the objective lens 60 described with reference to FIG. 6. Tables 4 through 6 show the optical design data of the chromatic aberration correction lenses 40, 140 and 240 and the objective lens 60. In Tables 4 through 6, the objective lens 60 has a numerical aperture of 0.75 with respect to the reference wavelength of 405 nm, and the optical design data thereof is the same as shown in Table 2. In addition, the conic constants and aspheric coefficients of the aspheric surfaces 1 and 2 of the objective lens 60 are the same as those shown in Table 3, and the focal length thereof is 3.000 mm. Each of the chromatic aberration correction lenses 40, 140 and 240 according to the embodiments of the present invention is configured such that at least two lenses having opposite powers are adjacent to each other. Among the at least two lenses, a lens having a positive power is formed of an optical material whose Abbe number at the d-line is larger than that of a material of which a lens having a negative power is formed.

Referring to FIG. 8 and Table 4, the chromatic aberration correction lens 40 according to a first embodiment of the present invention is comprised of a first lens 41 having a negative power and a second lens 45 having a positive power, which are sequentially disposed from the light source 10. The first and second lenses 41 and 45 have almost the same power magnitude. As shown in Table 4, the first and second lenses 41 and 45 are formed of glass materials having similar refractivities and different Abbe numbers at the d-line. The surfaces S1, S3 of the first and second lenses 41 and 45 facing the light source 10 and the objective lens 60, respectively, have relatively large radii of curvature, and the contact surface S2 between the first and second lenses 41 and 45 has a smaller radius of curvature.

In the chromatic aberration correction lens 40 having the above structure according to the first embodiment of the present invention, the focal length of the first lens 41 is −3.790843 mm, the focal length of the second lens 45 is 3.892900 mm, and the total focal length of the chromatic aberration correction lens 40 is about 171.985311426 m. The incident pupil diameter of the objective lens 60 is 3.9 mm. According to the chromatic aberration correction lens 40 and the objective lens 60 having the optical design data shown in Table 4, $$\sum_i \frac{1}{fi \cdot vi}$$

approximates to 0, that is, $$\sum_i \frac{1}{fi \cdot vi} \cong 0.0024.$$

Figure 9:
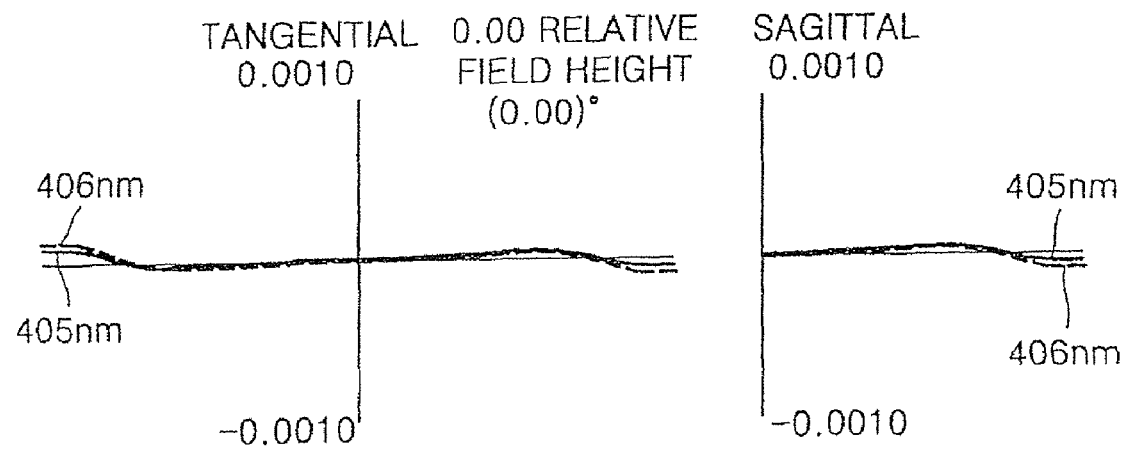
FIG. 9 is a graph illustrating aberrations of an objective lens in the optical pickup device of FIG. 8.

Therefore, the chromatic aberration occurring in the objective lens 60 due to a change in the wavelength of light emitted from the light source 10 when the chromatic aberration correction lens 40 is not used, as shown in FIG. 7, can be removed by employing the chromatic aberration correction lens 40 according to the first embodiment of the present invention. Consequently, in the case where the optical system structure of FIG. 8 and the optical design data shown in Table 4 are provided, referring to FIG. 9 illustrating the degrees of aberration of the objective lens 60, aberration rarely occurs in the objective lens 60 even when the wavelength of light emitted from the light source 10 changes from 405 nm, that is, the reference wavelength, to 406 nm.

Referring to FIG. 10 and Table 5, the chromatic aberration correction lens 140 according to a second embodiment of the present invention is comprised of a first lens 141 having a positive power and a second lens 145 having a negative power, which are sequentially disposed from the light source 10. As shown in Table 5, the surfaces S1, S3 of the first and second lenses 141 and 145 facing the light source 10 and the objective lens 60, respectively, have positive radii of curvature, and the contact surface S2 between the first and second lenses 141 and 145 has a negative radius of curvature. The magnitudes of the radii of curvature of the surfaces S1, S2, S3 of the first and second lenses 141 and 145 are similar to one another.

TABLE 4

| Element | Surfaces | Radius of curvature (mm) | Thickness/ gap (mm) | Material | Refractivity | Abbe number at the d-line |
| --- | --- | --- | --- | --- | --- | --- |
| Chromatic aberration correction lens 40 | S1 | −51.340719 | 1.000000 | EFD15 | 1.741876 | 30.1 |
| | S2 | 3.000000 | 2.300000 | LAF3 | 1.742841 | 48.0 |
| | S3 | −53.981665 | 10.00000 | | | |
| Objective lens 60 | S4 (aspheric surface 1) | 2.012300 | 1.700000 | 'OG' | 1.623855 | 57.8 |
| | S5 (aspheric surface 2) | −18.075156 | 1.656000 | | | |
| Recording medium 1 | S6 | ∞ | 0.600000 | 'CG' | 1.621462 | 31.0 |

TABLE 5

| Element | Surfaces | Radius of curvature (mm) | Thickness/ gap (mm) | Material | Refractivity | Abbe number at the d-line |
| --- | --- | --- | --- | --- | --- | --- |
| Chromatic aberration correction lens 140 | S1 | 7.320225 | 2.300000 | LAFL2 | 1.721766 | 48.5 |
| | S2 | −6.459849 | 1.000000 | EFD15 | 1.741876 | 30.1 |
| | S3 | 6.292012 | 10.00000 | | | |
| Objective | S4 (aspheric surface 1) | 2.012300 | 1.700000 | 'OG' | 1.623855 | 57.8 |

TABLE 5-continued

| Element | Surfaces | Radius of curvature (mm) | Thickness/ gap (mm) | Material | Refractivity | Abbe number at the d-line |
|---|---|---|---|---|---|---|
| lens 60 | S5 (aspheric surface 2) | −18.075156 | 1.656000 | | | |
| Recording medium 1 | S6 | ∞ | 0.600000 | 'CG' | 1.621462 | 31.0 |

In the chromatic aberration correction lens 140 having the above structure according to the second embodiment of the present invention, the focal length of the first lens 141 is 5.112121 mm, the focal length of the second lens 145 is −4.157561 mm, and the total focal length of the chromatic aberration correction lens 140 is about 109.823479554 m. The incident pupil diameter of the objective lens 60 is 4.8 mm. According to the chromatic aberration correction lens 140 and the objective lens 60 having the optical design data shown in Table 5, $$\sum_i \frac{1}{fi \cdot vi}$$

approximates to 0, that is, $$\sum_i \frac{1}{fi \cdot vi} \cong 0.0019.$$

Figure 11:
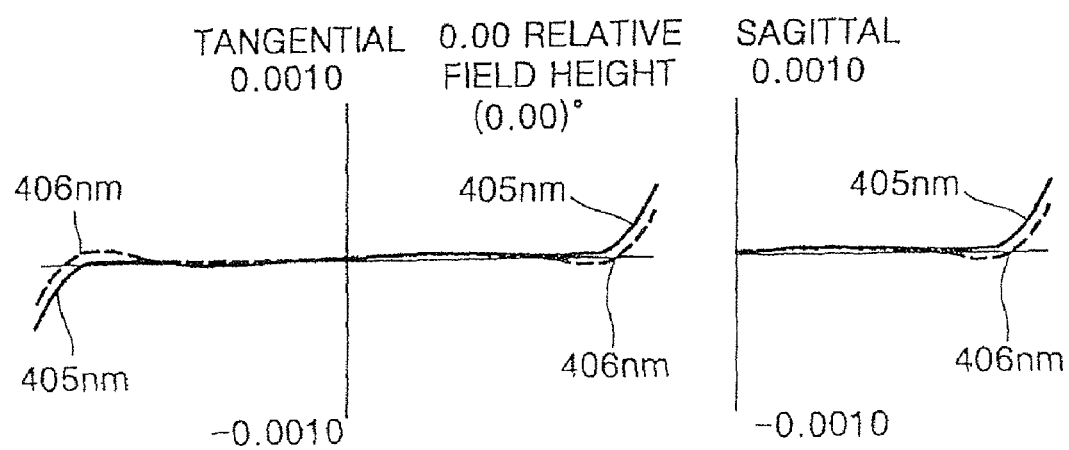
FIG. 11 is a graph illustrating aberrations of an objective lens in the optical pickup device of FIG. 10.

Consequently, in the case where the optical system structure of FIG. 10 and the optical design data shown in Table 5 are provided, as shown in FIG. 11 illustrating the aberration of the objective lens 60, when the chromatic aberration correction lens 140 according to the second embodiment of the present invention is used, the chromatic aberration is corrected so that aberration is minimal in the objective lens 60 even when the wavelength of light emitted from the light source 10 changes from 405 nm, that is, the reference wavelength, to 406 nm, similar to the case of using the chromatic aberration correction lens 40 according to the first embodiment of the present invention.

Referring to FIG. 12 and Table 6, the chromatic aberration correction lens 240 according to a third embodiment of the present invention is comprised of a first lens 241 having a negative power, a second lens 243 having a positive power and a third lens 245 having a negative power, which are sequentially disposed from the light source 10. As shown in Table 6, the first and third lenses 241 and 245 are formed of glass materials having similar Abbe numbers at the d-line, and the second lens 243 is formed of a glass material having an Abbe number at the d-line which is different from those of the first and third lenses 241 and 245. The surfaces S1, S4 of the first and third lenses 241 and 245 facing the light source 10 and the objective lens 60, respectively, have positive radii of curvature, the surface S2 between the first and second lenses 241 and 243 has a positive radius of curvature, and the surface S3 between the second and third lenses 243 and 245 has a negative radius of curvature.

TABLE 6

| Element | Surfaces | Radius of curvature (mm) | Thickness/ gap (mm) | Material | Refractivity | Abbe number at the d-line |
|---|---|---|---|---|---|---|
| Chromatic aberration correction lens 240 | S1 | 7.564520 | 1.000000 | EFD4 | 1.806295 | 27.5 |
| | S2 | 5.252096 | 3.000000 | BACD5 | 1.605256 | 61.3 |
| | S3 | −11.863307 | 1.000000 | EFD10 | 1.775916 | 28.3 |
| | S4 | 10.217745 | 10.000000 | | | |
| Objective lens 60 | S5 (aspheric surface 1) | 2.012300 | 1.700000 | 'OG' | 1.623855 | 57.8 |
| | S6 (aspheric surface 2) | −18.075156 | 1.656000 | | | |
| Recording medium 1 | S7 | ∞ | 0.600000 | 'CG' | 1.621462 | 31.0 |

In the chromatic aberration correction lens 240 having the above structure according to the third embodiment of the present invention, the focal length of the first lens 241 is 26.405720 mm, the focal length of the second lens 243 is 6.440303 mm, the focal length of the third lens 245 is −6.937722, and the total focal length of the chromatic aberration correction lens 240 is about 116.040546093 m. The incident pupil diameter of the objective lens 60 is 5.0 mm. According to the chromatic aberration correction lens 240 and the objective lens 60 having the optical design data shown in Table 6, $$\sum_i \frac{1}{fi \cdot vi}$$

approximates to 0, that is, $$\sum_i \frac{1}{fi \cdot vi} \cong 0.0019.$$

Figure 13:
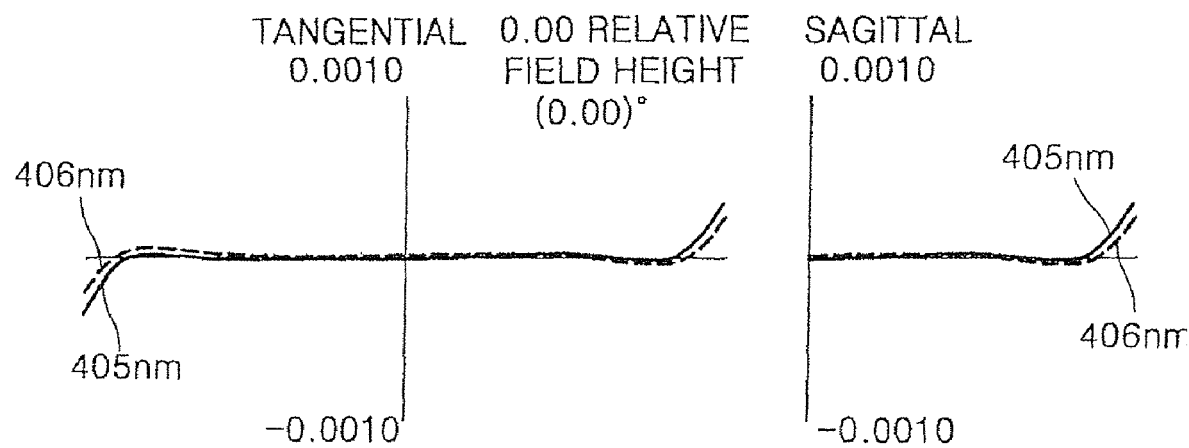
FIG. 13 is a graph illustrating aberrations of an objective lens in the optical pickup device of FIG. 12.

In other words, chromatic aberration occurring in the objective lens 60 can be almost removed when the chromatic aberration correction lens 240 according to this embodiment is used, similar to the case of using the chromatic aberration correction lens 40 according to the first embodiment of the present invention. Consequently, in the case where the optical system structure of FIG. 12 and the optical design data shown in Table 6 are provided, as shown in FIG. 13 illustrating the degrees of aberration of the objective lens 60, when the chromatic aberration correction lens 240 according to the third embodiment of the present invention is used, chromatic aberration is corrected so that aberration is minimal in the objective lens 60. This holds true even when the wavelength of light emitted from the light source 10 changes from 405 nm, that is, the reference wavelength, to 406 nm, like the case of using the chromatic aberration correction lens 40 according to the first embodiment of the present invention.

Figure 14:
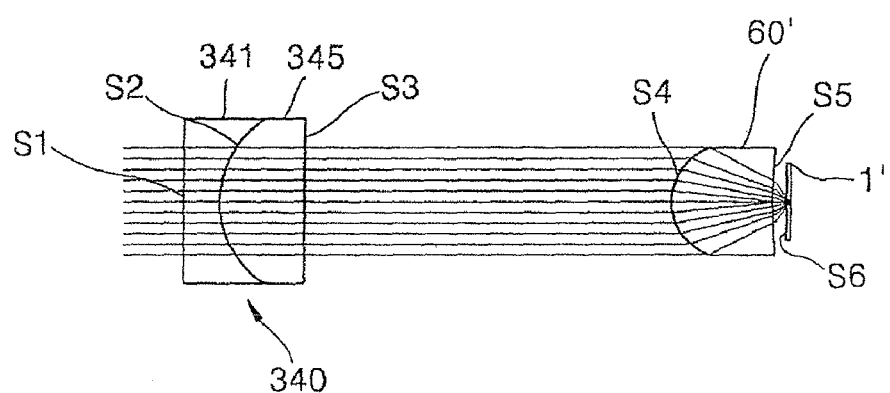
FIG. 14 is a schematic diagram illustrating the main portions and optical paths of an optical pickup device to which a chromatic aberration correction lens according to a fourth embodiment of the present invention is applied.

For example, when an optical pickup device 105 according to the present invention is designed such that an objective lens 60' having a numerical aperture of 0.85 with respect to the reference wavelength of 405 nm focuses incident parallel light on a recording medium 1' having a thickness of 0.1 mm to form a light spot, the optical structure and the optical design data of the objective lens 60' and the chromatic aberration correction lens 40 according to the first embodiment are changed as shown in FIG. 14 and Table 7, resulting in chromatic aberration correction lens 340.

TABLE 7

| Element | Surfaces | Radius of curvature (mm) | Thickness/ gap (mm) | Material | Refractivity | Abbe number at the d-line |
|---|---|---|---|---|---|---|
| Chromatic aberration correction lens 340 | S1 | −1114.82920 | 1.000000 | EFD15 | 1.741876 | 30.1 |
|  | S2 | 2.57236 | 3.000000 | LAF3 | 1.742841 | 48.0 |
|  | S3 | −2735.69376 | 10.00000 |  |  |  |
| Objective lens 60' | S4 (aspheric surface 1') | 1.41052 | 2.750000 | 'OG' | 1.715566 | 53.2 |
|  | S5 (aspheric surface 2') | −2.48758 | 0.271251 |  |  |  |
| Recording medium 1' | S6 | ∞ | 0.100000 | 'CG' | 1.621462 | 31.0 |

The chromatic aberration correction lenses 40, 140 and 240 according to the first through third embodiments of the present invention described above are designed to be suitable for a high density optical pickup device, which includes the objective lens 60 having a numerical aperture of 0.75 and is suitable for the recording medium 1 having a thickness of 0.6 mm. Even if the numerical aperture of the objective lens 60 and the thickness of the recording medium 1 change, the chromatic aberration can be effectively corrected as in the above three embodiments just by appropriately changing the optical design data of each of the chromatic aberration correction lenses 40, 140 and 240. In other words, when a high density optical pickup device according to the present invention is designed to form a light spot on a recording medium 1 having a thickness of smaller than 0.6 mm with an objective lens 60 having a numerical aperture of larger than 0.75, each of the chromatic aberration correction lenses 40, 140 and 240 having structures according to the first through third embodiments of the present invention is newly designed to be suitable for the conditions of the objective lens 60 and the recording medium 1.

The objective lens 60' is a bi-convex lens whose both surfaces are aspheric. Table 8 shows the conic constants and aspheric coefficients of the aspheric surfaces S4 and S5 of the objective lens 60'.

TABLE 8

|  | Conic constants (K) | Aspheric coefficients | | |
|---|---|---|---|---|
| Aspheric surface S4 | −0.697423 | A: 0.121877E−01 | B: 0.186663E−02 | C: 0.411872E−03 |
|  |  | D: −0.145635E−03 | E: 0.658968E−04 | F: 0.224260E−04 |
|  |  | G: 0.560839E−05 | H: −0.307800E−05 | J: −0.233787E−05 |
| Aspheric surface S5 | −27.258190 | A: 0.359235E+00 | B: 0.784442E−01 | C: −0.172135E+01 |
|  |  | D: 0.196996E+01 | E: −0.111915E−09 | F: −0.913659E−11 |
|  |  | G: −0.735287E−12 | H: −0.175404E−13 | J: 0.636830E−15 |

The incident pupil diameter of light incident on the objective lens 60' in parallel is 3.03 mm, and the focal length of the objective lens 60' is about 1.782400 mm.

Like the chromatic aberration correction lens 40 according to the first embodiment of the present invention described above with reference to FIG. 8 and Table 4, the chromatic aberration correction lens 340 is comprised of a first lens 341 having a negative power and a second lens 345 having a positive power, which are sequentially disposed from the light source 10. As shown in Table 7, the first and second lenses 341 and 345 are formed of glass materials having similar refractivities and different Abbe numbers at the d-line. The surfaces S1, S3 of the first and second lenses 341 and 345 facing the light source 10 and the objective lens 60', respectively, have very large negative radii of curvature, and the surface S2 between the first and second lenses 341 and 345 has a small radius of curvature.

When the chromatic aberration correction lens 340 having the above structure is configured to be suitable for the objective lens 60' having a numerical aperture of 0.85 and the recording medium 1' having a thickness of 0.1 mm based on the optical data shown in Table 7, the focal length of the first lens 341 is −3.45806 mm, the focal length of the second lens 345 is 3.460852 mm, and the total focal length of the chromatic aberration correction lens 340 is about −53.801051977 m. According to the chromatic aberration correction lens 340 and the objective lens 60' having the optical design data shown in Tables 7 and 8, $$\sum_i \frac{1}{fi \cdot vi}$$

approximates to 0, that is, $$\sum_i \frac{1}{fi \cdot vi} \cong 0.0070.$$

Figure 15:
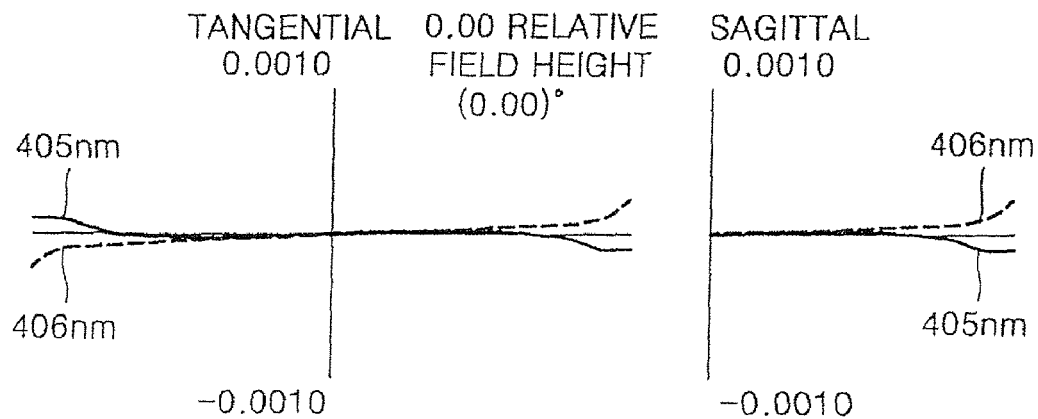
FIG. 15 is a graph illustrating aberrations of an objective lens in the optical pickup device of FIG. 14.

FIG. 15 illustrates the aberration of the objective lens 60' when the optical system structure of FIG. 14 and the optical design data shown in Tables 7 and 8 are provided. As shown in FIG. 15, even when the wavelength of light emitted from the light source 10 changes from 405 nm, that is, the reference wavelength, to 406 nm, the chromatic aberration is corrected by the chromatic aberration correction lens 340 so that aberration is minimal in the objective lens 60'. Accordingly, even when the chromatic aberration correction lens 340 according to the present invention is adopted for an ultrahigh density optical pickup device, for example, which forms a light spot on the recording medium 1' having a thickness of 0.1 mm with the objective lens 60' having a numerical aperture of about 0.85, the chromatic aberration correction lens 340 can effectively remove chromatic aberration occurring in the objective lens 60'.

As is known from the above detailed embodiments, in a high density optical pickup device employing a chromatic aberration correction lens according to the present invention, $$\sum_i \frac{1}{fi \cdot vi}$$

has a value which is close to 0 and satisfies the range defined by Equation (1). In addition, a chromatic aberration correction lens according to the present invention has an optical power of nearly 0 and an infinite focal length of at least 10 m. Accordingly, when the height of light incident on the chromatic aberration correction lens is $h_i$, and the height of light coming out through the chromatic aberration correction lens is $h_o$, the chromatic aberration correction lens satisfies $0.95 \leq h_o/h_i \leq 1.05$. Consequently, a chromatic aberration correction lens according to the present invention can correct chromatic aberration occurring in an objective lens due to a change in a wavelength resulting from a change in the light output power of the light source 10 and/or due to an increase in a wavelength bandwidth caused by driving the light source 10 with HF, and is advantageous in that it can be simply added to an optical pickup device without changing the optical system structure of the optical pickup device.

As described above, a high density optical pickup device according to the present invention is provided with a chromatic aberration correction lens having an infinite focal length as compared to an objective lens and corrects chromatic aberration using the refraction of optical materials, thereby having a high light efficiency. In addition, an optical pickup device according to the present invention is provided with a collimating lens to change diverging light emitted from a light source into parallel light and a separate chromatic aberration correction lens, thereby recording information with light of relatively low power. Moreover, since a chromatic aberration correction lens has an optical power of nearly 0, it can be simply installed without changing the optical system structure.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical system for an optical pickup device, the system comprising:
 a single objective lens having a numerical aperture (NA) of 0.85 or more, wherein both lens surfaces of the single objective lens are aspherical; and
 a chromatic aberration correction lens that corrects chromatic aberration occurring in the single objective lens due to a change in wavelength and/or due to an increase in a wavelength bandwidth of light emitted from the light source;
 wherein the chromatic aberration correction lens has an optical structure satisfying the following condition:

$$0.95 \leq \frac{h_o}{h_i} \leq 1.05$$

where $h_i$ is the height of light incident on the chromatic aberration correction lens, and $h_o$ is the height of light coming out through the chromatic aberration correction lens.

2. The optical system of claim 1, wherein the numerical aperture (NA) is equal to or greater than 0.85 with respect to light having a wavelength of 420 nm or less.

3. The optical system of claim 1, wherein the numerical aperture (NA) is 0.85.

4. The optical system of claim 1, wherein each of the aspherical lens surfaces is defined by the following equation:

$$z = \frac{ch^2}{1 + \sqrt{1 - (1+K)c^2h^2}} + Ah^4 + Bh^6 + Ch^8 + Dh^{10} + Eh^{12} + Fh^{14} + Gh^{16} + Hh^{18} + Jh^{20}$$

where z is a depth from an apex of the aspherical lens surface, h is a height from an optical axis of the aspherical lens surface, c is a curvature, K is a conical constant, and A, B, C, D, E, F, G, H, I, J are aspherical coefficients.

5. The optical system of claim 1, wherein the single objective lens is made of glass or plastic.

6. An optical pickup device comprising the optical system of claim 1.

7. The optical pickup device of claim 6, wherein the numerical aperture (NA) is equal to or greater than 0.85 with respect to light having a wavelength of 420 nm or less.

8. The optical pickup device of claim 6, wherein the numerical aperture (NA) is 0.85.

9. The optical pickup device of claim 6, wherein each of the aspherical lens surfaces is defined by the following equation:

$$z = \frac{ch^2}{1 + \sqrt{1 - (1+K)c^2h^2}} + Ah^4 + Bh^6 +$$
$$Ch^8 + Dh^{10} + Eh^{12} + Fh^{14} + Gh^{16} + Hh^{18} + Jh^{20}$$

where z is a depth from an apex of the aspherical lens surface, h is a height from an optical axis of the aspherical lens surface, c is a curvature, K is a conical constant, and A, B, C, D, E, F, G, H, I, J are aspherical coefficients.

10. The optical pickup device of claim 6, wherein the single objective lens is made of glass or plastic.

11. The optical pickup device of claim 6, further comprising a light source emitting light having a wavelength of 420 nm or less.

12. The optical pickup device of claim 11, wherein the chromatic aberration correction lens comprises at least two lenses such that a lens having a positive power and a lens having a negative power are adjacent to each other, and a total focal length of the chromatic aberration correction lens is at least 10 m.

13. The optical pickup device of claim 12, wherein an Abbe number at a d-line of an optical material of the lens having the positive power is larger than an Abbe number at the d-line of an optical material of the lens having the negative power.

14. The optical pickup device of claim 12, wherein the chromatic aberration correction lens comprises a first lens having a negative power and a second lens having a positive power sequentially disposed from the light source, and the first lens and the second lens have similar powers.

15. The optical pickup device of claim 14, wherein respective optical materials of the first lens and the second lens have different Abbe numbers at a d-line and similar refractivities.

16. The optical pickup device of claim 14, wherein an absolute value of a radius of curvature of a surface of the first lens facing the light source and an absolute value of a radius of curvature of a surface of the second lens facing the single objective lens are larger than an absolute value of a radius of curvature of a surface of the first lens facing the single objective lens and an absolute value of a radius of curvature of a surface of the second lens facing the light source.

17. The optical pickup device of claim 13, wherein the chromatic aberration correction lens comprises a first lens having a positive power and a second lens having a negative power sequentially disposed from the light source, a surface of the first lens facing the light source and a surface of the second lens facing the single objective lens each have a positive radius of curvature, a surface of the first lens facing the single objective lens and a surface of the second lens facing the light source each have a negative radius of curvature, and the radii of curvature of all of the surfaces have substantially similar magnitudes.

18. The optical pickup device of claim 13, wherein the chromatic aberration correction lens comprises a first lens having a negative power, a second lens having a positive power, and a third lens having a negative power sequentially disposed from the light source.

19. The optical pickup device of claim 18, wherein respective optical materials of the first lens and the third lens have similar Abbe numbers at a d-line, and an optical material of the second lens has an Abbe number at the d-line that is substantially different from the Abbe numbers at the d-line of the respective optical materials of the first lens and the third lens.

20. The optical pickup device of claim 18, wherein a surface of the first lens facing the light source and a surface of the third lens facing the single objective lens each have a positive radius of curvature, a surface of the first lens facing the single objective lens and a surface of the second lens facing the light source each have a positive radius of curvature, and a surface of the second lens facing the single objective lens and a surface of the third lens facing the light source each have a negative radius of curvature.

21. The optical pickup device of claim 11, wherein the chromatic aberration correction lens and the single objective lens have optical structures satisfying the following condition:

$$0 < \frac{1}{f1 \cdot v1} + \frac{1}{f2 \cdot v2} + \ldots + \frac{1}{fn \cdot vn} < 0.008$$

where focal lengths of lenses constituting the chromatic aberration correction lens and the single objective lens with respect to the light source are f1, f2, ... and fn, and Abbe numbers of respective optical materials of the lenses at a d-line are v1, v2, ... vn.

22. The optical pickup device of claim 21, wherein the chromatic aberration correction lens and the single objective lens have optical structures satisfying the following condition:

$$0 < \frac{1}{f1 \cdot v1} + \frac{1}{f2 \cdot v2} + \ldots + \frac{1}{fn \cdot vn} < 0.007.$$

23. An optical recording/reproducing device comprising the optical pickup device of claim 6.

24. The optical recording/reproducing device of claim 23, wherein the numerical aperture (NA) is equal to or greater than 0.85 with respect to light having a wavelength of 420 nm or less.

25. The optical recording/reproducing device of claim 23, wherein the numerical aperture (NA) is 0.85.

26. The optical recording/reproducing device of claim 23, wherein each of the aspherical lens surfaces is defined by the following equation:

$$z = \frac{ch^2}{1 + \sqrt{1 - (1+K)c^2h^2}} + Ah^4 + Bh^6 +$$
$$Ch^8 + Dh^{10} + Eh^{12} + Fh^{14} + Gh^{16} + Hh^{18} + Jh^{20}$$

where z is a depth from an apex of the aspherical lens surface, h is a height from an optical axis of the aspherical lens surface, c is a curvature, K is a conical constant, and A, B, C, D, E, F, G, H, I, J are aspherical coefficients.

27. The optical recording/reproducing device of claim 23, wherein the single objective lens is made of glass or plastic.

28. The optical recording/reproducing device of claim 23, further comprising a light source emitting light having a wavelength of 420 nm or less.

29. The optical recording/reproducing device of claim 28, wherein the chromatic aberration correction lens comprises at least two lenses such that a lens having a positive power and a lens having a negative power are adjacent to each other, and a total focal length of the chromatic aberration correction lens is at least 10 m.

30. The optical recording/reproducing device of claim 29, wherein an Abbe number at a d-line of an optical material of the lens having the positive power is larger than an Abbe number at the d-line of an optical material of the lens having the negative power.

31. The optical recording/reproducing device of claim 29, wherein the chromatic aberration correction lens comprises a first lens having a negative power and a second lens a having positive power sequentially disposed from the light source, and the first lens and the second lens have similar powers.

32. The optical recording/reproducing device of claim 31, wherein respective optical materials of the first lens and the second lanes have different Abbe numbers at a d-line and similar refractivities.

33. The optical recording/reproducing device of claim 31, wherein an absolute value of a radius of curvature of a surface of the first lens facing the light source and an absolute value of a radius of curvature of a surface of the second lens facing the single objective lens are larger than an absolute value of a radius of curvature of a surface of the first lens facing the single objective lens and an absolute value of a radius of curvature of a surface of the second lens facing the light source.

34. The optical recording/reproducing device of claim 29, wherein the chromatic aberration correction lens comprises a first lens having a positive power and a second lens having a negative power sequentially disposed from the light source, a surface of the first lens facing the light source and a surface of the second lens facing the single objective lens each have a positive radius of curvature, a surface of the first lens facing the single objective lens and a surface of the second lens facing the light source each have a negative radius of curvature, and the radii of curvature of all of the surfaces have substantially similar magnitudes.

35. The optical recording/reproducing device of claim 29, wherein the chromatic aberration correction lens comprises a first lens having a negative power, a second lens having a positive power, and a third lens having a negative power sequentially disposed from the light source.

36. The optical recording/reproducing device of claim 35, wherein respective optical materials of the first lens and the third lens have similar Abbe numbers at a d-line, and an optical material of the second lens has an Abbe number at the d-line that is substantially different from the Abbe numbers at the d-line of the respective optical materials of the first lens and the third lens.

37. The optical recording/reproducing device of claim 35, wherein a surface of the first lens facing the light source and a surface of the third lens facing the single objective lens each have a positive radius of curvature, a surface of the first lens facing the single objective lens, a surface of the second lens facing the light source each have a positive radius of curvature, and a surface of the second lens facing the single objective lens and a surface of the third lens facing the light source each have a negative radius of curvature.

38. The optical recording/reproducing device of claim 28, wherein the chromatic aberration correction lens and the single objective lens have optical structures satisfying the following condition:

$$0 < \frac{1}{f1 \cdot v1} + \frac{1}{f2 \cdot v2} + \ldots + \frac{1}{fn \cdot vn} < 0.008$$

where focal lengths of lenses constituting the chromatic aberration correction lens and the single objective lens with respect to the light source are f1, f2, . . . and fn, and Abbe numbers of respective optical materials of the lenses at a d-line are v1, v2, . . . vn.

39. The optical recording/reproducing device of claim 38, wherein the chromatic aberration correction lens and the single objective lens have optical structures satisfying the following condition:

$$0 < \frac{1}{f1 \cdot v1} + \frac{1}{f2 \cdot v2} + \ldots + \frac{1}{fn \cdot vn} < 0.007.$$

40. An optical system for an optical pickup device, the system comprising:
a single objective lens having a numerical aperture (NA) of 0.85 or more, wherein both lens surfaces of the single objective lens are aspherical; and
a chromatic aberration correction lens that corrects chromatic aberration occurring in the single objective lens due to a change in wavelength and/or due to an increase in a wavelength bandwidth of light emitted from the light source;
wherein the chromatic aberration correction lens and the single objective lens have optical structures satisfying the following condition:

$$0 < \frac{1}{f1 \cdot v1} + \frac{1}{f2 \cdot v2} + \ldots + \frac{1}{fn \cdot vn} < 0.008$$

where focal lengths of lenses constituting the chromatic aberration correction lens and the single objective lens with respect to the light source are f1, f2, . . . and fn, and Abbe numbers of respective optical materials of the lenses at a d-line are v1, v2, . . . vn.

41. The optical system of claim 1, wherein the light incident on the chromatic aberration correction lens is parallel light, and the light coming out through the chromatic aberration correction lens is parallel light.

42. The optical system of claim 1, wherein the light incident on the chromatic aberration correction lens is parallel light, or the light coming out through the chromatic aberration correction lens is parallel light.

43. The optical system of claim 42, wherein the height $h_i$ is defined as a distance between an optical axis of the chromatic aberration correction lens and an outermost position of the light incident on the chromatic aberration correction lens.

44. The optical system of claim 43, wherein the height $h_o$ is defined as a distance between the optical axis of the chromatic aberration correction lens and an outermost position of the light coming out through the chromatic aberration correction lens.

* * * * *